US009128747B2

(12) United States Patent
Rajaraman (10) Patent No.: US 9,128,747 B2
(45) Date of Patent: Sep. 8, 2015

(54) METHODS AND SYSTEMS FOR OPTIMIZING THE PERFORMANCE OF SOFTWARE APPLICATIONS AT RUNTIME

(75) Inventor: Prasanna Rajaraman, Chennai (IN)

(73) Assignee: Infosys Limited, Bangalore (IN)

( * ) Notice: Subject to any disclaimer, the term of this patent is extended or adjusted under 35 U.S.C. 154(b) by 472 days.

(21) Appl. No.: 13/532,490

(22) Filed: Jun. 25, 2012

(65) Prior Publication Data

US 2013/0254754 A1 Sep. 26, 2013

(30) Foreign Application Priority Data

Mar. 20, 2012 (IN) .......................... 1011/CHE/2012

(51) Int. Cl.
*G06F 9/44* (2006.01)
*G06F 9/45* (2006.01)
*G06F 11/34* (2006.01)

(52) U.S. Cl.
CPC ............ *G06F 8/456* (2013.01); *G06F 11/3404* (2013.01)

(58) Field of Classification Search
CPC ...................................................... G06F 8/456
USPC ........................................................ 717/149
See application file for complete search history.

(56) References Cited

U.S. PATENT DOCUMENTS

| 5,524,242 A * | 6/1996 | Aida et al. ................... 717/149 |
| 5,978,583 A | 11/1999 | Ekanadham et al. |
| 5,999,734 A * | 12/1999 | Willis et al. ................... 717/149 |
| 6,321,373 B1 * | 11/2001 | Ekanadham et al. ......... 717/119 |
| 7,788,672 B2 * | 8/2010 | Tanaka ........................... 718/106 |
| 8,108,844 B2 * | 1/2012 | Crutchfield et al. ........... 717/149 |
| 2007/0294665 A1* | 12/2007 | Papakipos et al. ............ 717/119 |
| 2007/0294681 A1* | 12/2007 | Tuck et al. ..................... 717/149 |
| 2008/0301677 A1* | 12/2008 | Park et al. ..................... 718/100 |
| 2013/0254754 A1* | 9/2013 | Rajaraman ..................... 717/149 |

* cited by examiner

*Primary Examiner* — Don Wong
*Assistant Examiner* — Theodore Hebert
(74) *Attorney, Agent, or Firm* — LeClairRyan, a Professional Corporation (57) ABSTRACT

Systems and method for optimizing the performance of software applications are described. Embodiments include computer implemented steps for identifying at least two constituent software components for parallel execution, executing the identified software components, profiling the performance of the one or more software components at an execution time, creating an optimization model with the set of data gathered from profiling the execution of the one or more software components, and marking at least two software components for execution in parallel in a subsequent execution on the basis of the optimization model. In additional embodiments, the optimization model may be reconfigured on the basis of a cost-benefit analysis of parallelization, and the software components involved marked for sequential execution if the resource overhead associated with parallelization exceeds the corresponding resource or throughput benefit.

27 Claims, 5 Drawing Sheets

METHODS AND SYSTEMS FOR OPTIMIZING THE PERFORMANCE OF SOFTWARE APPLICATIONS AT RUNTIME

This application claims the benefit of Indian Patent Application Filing No. 1011/CHE/2012, filed Mar. 20, 2012, which is hereby incorporated by reference in its entirety.

FIELD

The invention relates generally to runtime optimization of software applications. In particular, the invention relates to the optimization of a software application by selective parallelization, at runtime, of components or threads therein.

BACKGROUND

Currently, software performance optimizations at a macroscopic level may be done manually, such as by a software developer. Additionally, optimizations may be done at a lower level through a software compiler during translation of high level code to machine code. However, existing runtime optimizations may be limited to rationalization of resource usage and may not modify internal program or workflow structures.

Existing methods for runtime optimization, by being restricted to operating at a level specified by a designer, may inhibit self-optimization. Runtime parallelization techniques that are applied as a result of static decisions at design time, or limited to component levels, may fail to include considerations such as a runtime load, or resource availability, in their optimization routines. That is, generally, static decisions or initial design choices at design time may not be overridden at runtime on the basis of a runtime system resource snapshot, thereby impeding self-optimization.

Accordingly, there is a need for systems and method for optimizing the performance of software applications at runtime that take the above factors into consideration.

SUMMARY

Embodiments of the present invention include a computer implemented method for optimizing the performance of one or more software components, the method comprising identifying at least two constituent software components for parallel execution, wherein a software component is selected from a group consisting of a software application, workflow, process, and a software component that implements at least one discrete functionality. The method further includes executing the identified software components, profiling the performance of the one or more software components at an execution time, wherein profiling comprises gathering a set of data related to one or more performance characteristics of the one or more software components at runtime, creating an optimization model with the set of data gathered from profiling the execution of the one or more software components, wherein criteria involved in the design of the optimization model may include a resource requirement for executing a software component and a cost-benefit evaluation associated with an overhead involved in the execution of a software component in parallel with other identified software components, and marking at least two software components for execution in parallel in a subsequent execution on the basis of the optimization model.

In an additional embodiment, a system for optimizing the performance of one or more software components is described, the system comprising one or more processing units and a processor readable memory, the memory containing one or more programming instructions to identify at least two constituent software components for parallel execution, wherein a software component is selected from a group consisting of a software application, a workflow, a process, and a software component implementing one or more discrete functionality. The system is additionally configured to execute the identified software components, profile the performance of the one or more software components at an execution time, wherein profiling comprises gathering a set of data related to one or more performance characteristics of the one or more software components at runtime, create an optimization model with the set of data gathered from profiling the execution of the one or more software components, and mark at least two software components for execution in parallel in a subsequent execution on the basis of the optimization model.

In an additional embodiment, a non-transitory computer readable storage medium having stored thereon computer executable instructions for performing a method of optimizing the performance of one or more software components at runtime is described, the method comprising identifying at least two constituent software components for parallel execution, wherein a software component is selected from a group consisting of a software application, a workflow, a process, and a software component implementing at least one discrete functionality, executing the identified software components; profiling the performance of the one or more software components at an execution time, wherein profiling comprises gathering a set of data related to one or more performance characteristics of the one or more software components at runtime, and wherein the set of data gathered by profiling comprises a processor utilization metric, a memory usage metric, a disk usage metric and a computational resource overhead involved in running components in parallel, creating an optimization model with the set of data gathered from profiling the execution of the one or more software components, wherein criteria involved in the design of the optimization model include resource availability and a cost-benefit evaluation associated with an overhead involved in the execution of a component in parallel with other identified components and marking at least two software components for execution in parallel in a subsequent execution on the basis of the optimization model.

DRAWINGS

These and other features, aspects, and advantages of the present invention will be better understood when the following detailed description is read with reference to the accompanying drawings in which like characters represent like parts throughout the drawings, wherein.

While systems and methods are described herein by way of example and embodiments, those skilled in the art recognize that systems and methods for optimizing the performance of software applications at runtime are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following description is the full and informative description of the best method and system presently contemplated for carrying out the present invention which is known to the inventors at the time of filing the patent application.

The present invention relates to systems and methods for optimizing the performance of one or more software components at runtime.

Embodiments of the present invention improve upon current software performance optimization processes by optimizing the performance of software components based on runtime resource availability and the intrinsic parallelability of such resources. Secondly, the throughput and performance of the entire system is taken into consideration, which is especially pertinent if two or more applications execute on the same runtime. Application optimization is moved from a developer to a runtime focus by means of the disclosed embodiments. To this end, in accordance with some disclosed embodiments, the runtime may dynamically modify characteristics and runtime code of software to maximize system throughput.

Figure 1:
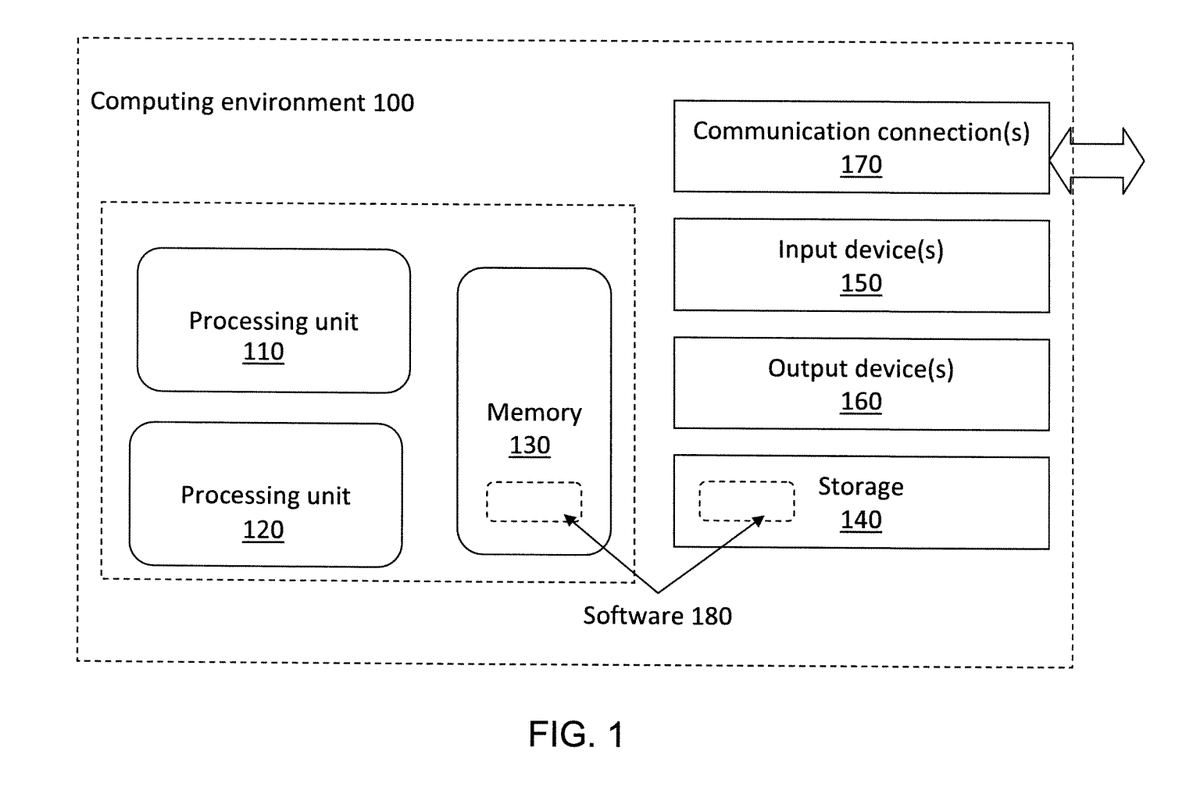
FIG. 1 is an illustrative block diagram of computer architecture suitable for the implementation of one or more embodiments.

One or more of the above-described techniques may be implemented in or involve one or more computer systems. FIG. 1 illustrates a generalized example of a computing environment 100. The computing environment 100 is not intended to suggest any limitation as to scope of use or functionality of described embodiments.

With reference to FIG. 1, the computing environment 100 includes at least one processing unit 110 and memory 120. The at least one processing unit 110 executes computer-executable instructions and may be a real or a virtual processor. In a multi-processing system, multiple processing units may execute computer-executable instructions to increase processing power. The memory 120 may be volatile memory (e.g., registers, cache, RAM), non-volatile memory (e.g., ROM, EEPROM, flash memory, etc.), or some combination of the two. In some embodiments, the memory 120 stores software 180 implementing described techniques.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, CD-RWs, DVDs, or any other medium which may be used to store information and which may be accessed within the computing environment 100. In some embodiments, the storage 140 stores instructions for the software 180.

The input device(s) 150 may be a touch input device such as a keyboard, mouse, pen, trackball, touch screen, or game controller, a voice input device, a scanning device, a digital camera, or another device that provides input to the computing environment 100. The output device(s) 160 may be a display, printer, speaker, or another device that provides output from the computing environment 100.

The communication connection(s) 170 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 100, computer-readable media include memory 120, storage 140, communication media, and combinations of any of the above.

Figure 2:
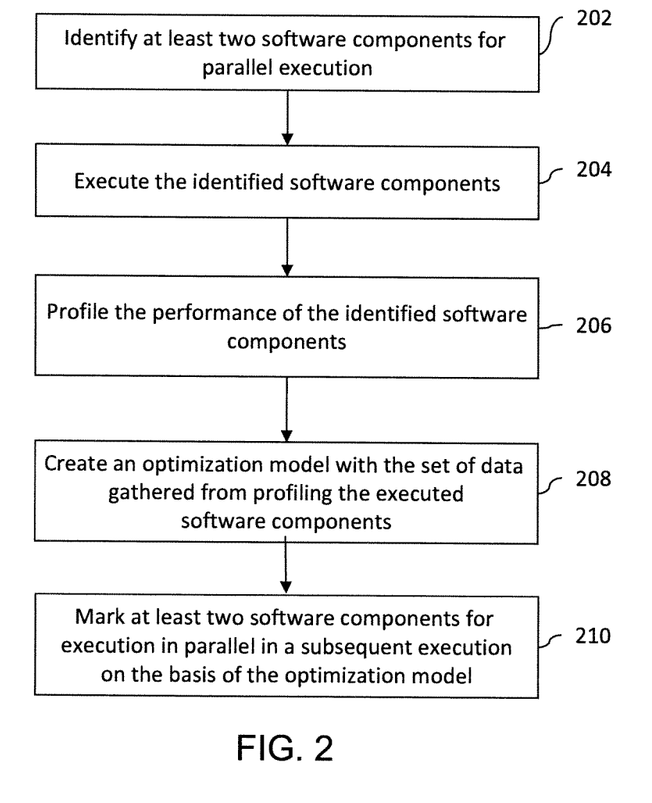
FIG. 2 is an illustrative flow diagram of a method for the optimization of one or more software components at runtime.

With reference to FIG. 2, in accordance with an embodiment of the present invention, firstly, as in a block 202, at least two software components for parallel execution may be identified. Identification may be performed at a deployment or an installation time of the subcomponents that can be potentially executed in a parallel manner. Such installed subcomponents may be coded as parallel or iterative execution loops. In some embodiments, identification of such subcomponents may be performed by a human, such as a programmer through, for example, API calls. Identification may otherwise be performed automatically at a compile-time or runtime. The runtime environment may automatically mark blocks as parallelizable, i.e. able to be executed in parallel, based on data it collects during the execution of a program.

Then, as in a block 204, the identified software components may be executed and, as in a block 206, the performance of the identified software components may be profiled. Profiling includes analysis of system memory usage, processor usage, such as monitoring the instructions executed and the workload, and monitoring the frequency of any extant function calls by the executing software components.

Then, as in a block 208, an optimization model may be created with a set of data gathered from profiling the executed software components. The optimization model may be used to determine, from the profiling data, the cost of parallelization against the cost of serialized execution of the components. Criteria involved in the optimization model may include the resource consumption or requirement of the processes or operations that are identified as parallelizable, where the resource consumption measured is, for example, memory or disk usage, network usage, or processor utilization. Additional criteria in the optimization model include measurement of a resource overhead involved in running the particular processes or operations in a parallel manner. Additional elements of the optimization model may include a measurement of the execution time and computing resource cost involved in running the software components as originally coded. In some embodiments, runtime data collected may be compared with that present in the optimization model, in order to further optimize the model. The optimization model may be reconfigured accordingly, in subsequent executions, to achieve better resource utilization. Such information can additionally be used to redefine the parallelizable blocks.

Then, as in a block 210, at least two software components may be marked for execution in parallel in a subsequent execution on the basis of the optimization model.

In some embodiments, if a parallelizable block is identified that is not time or resource efficient on the basis of the collected profiling data, the optimization model may be modified to ensure that the block is executed in a sequential manner. In some embodiments, based on the extant system load, resource allocation to a process may be increased in order to enable execution in parallel and ensure there is no reduction in throughput.

Figure 3:
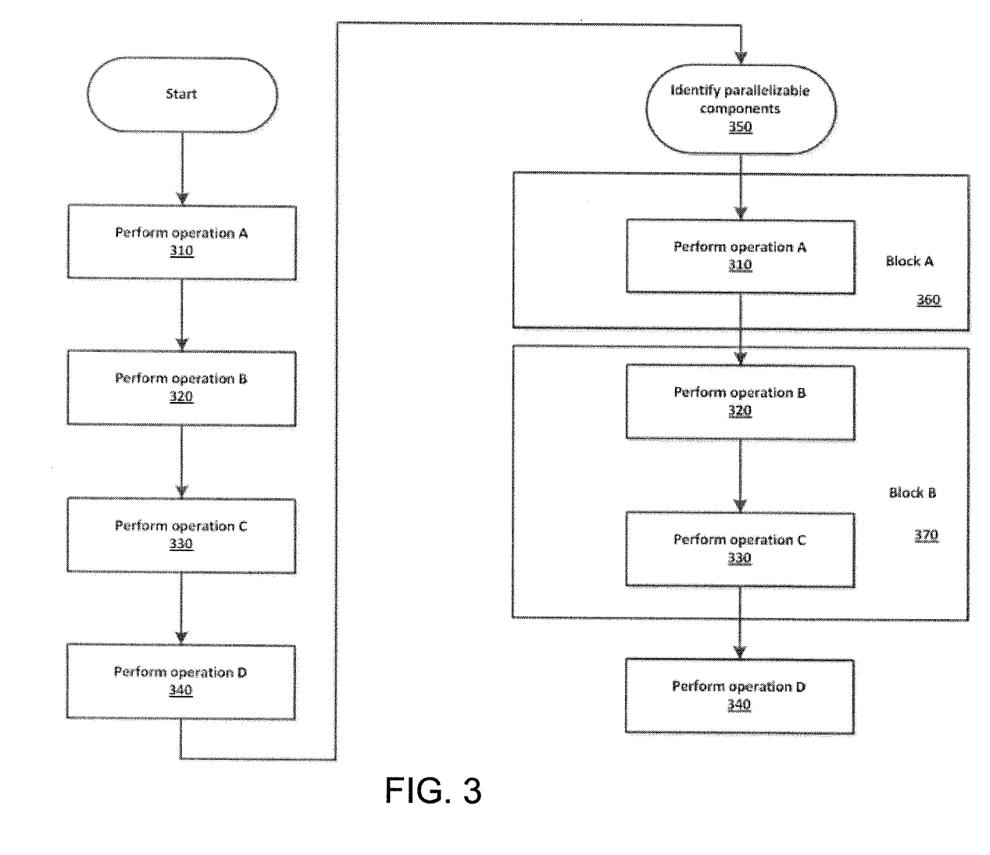
FIG. 3 is an illustrative flow diagram depicting steps involved in the identification of parallelizable components during the execution of a software application.
Figure 4:
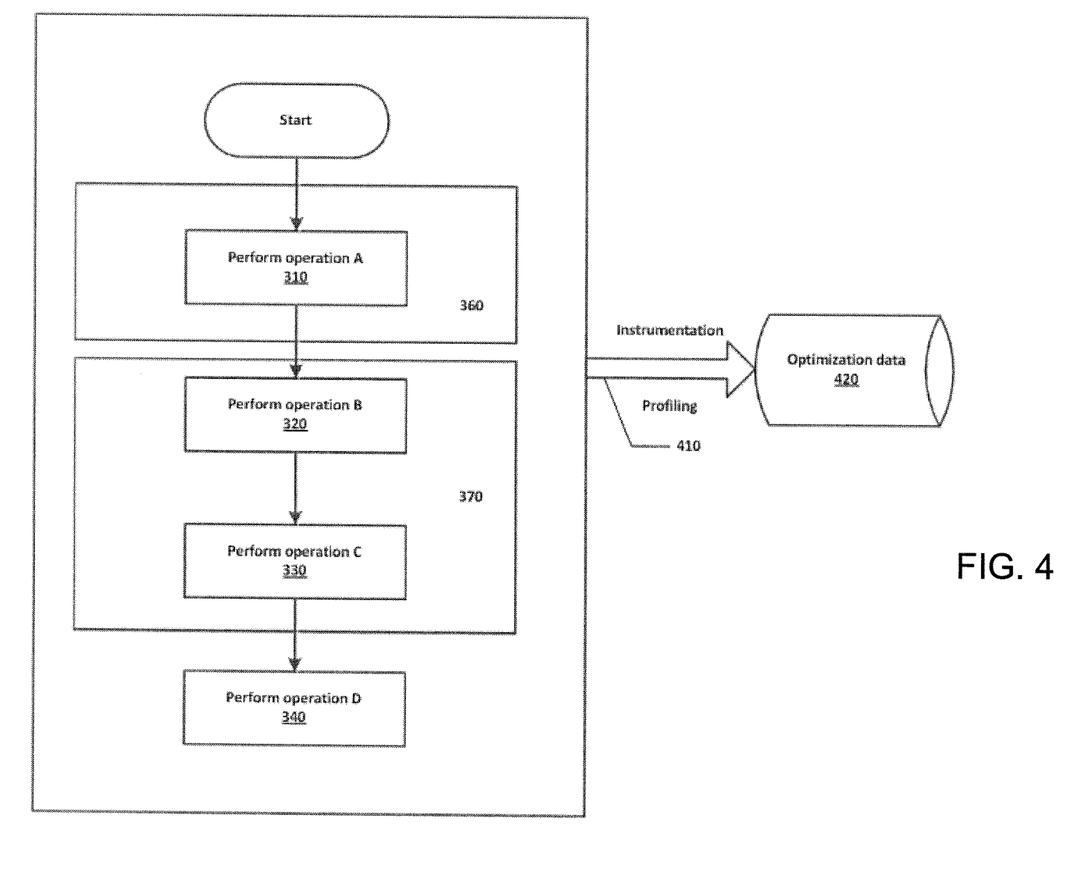
FIG. 4 is an illustrative flow diagram depicting steps involved in the profiling of a software application.

For example, as in FIG. 3, a computer system, such as that described in FIG. 1, may run software that performs as in 310, an operation A, and then, sequentially, an operation B as in 320, an operation C, as in 330, and an operation D, as in 340, in a first iteration. In order to optimize subsequent iterations, parallelizable components 350 are identified. The components identified are marked as a first parallelizable block; block A that comprises, for example, operation A, as in 360, and a second parallelizable block, block B 370 that comprises operations B and C. Referring now to FIG. 4, the execution of the blocks may be profiled, as in 410, and the optimization data stored, as in 420.

Figure 5:
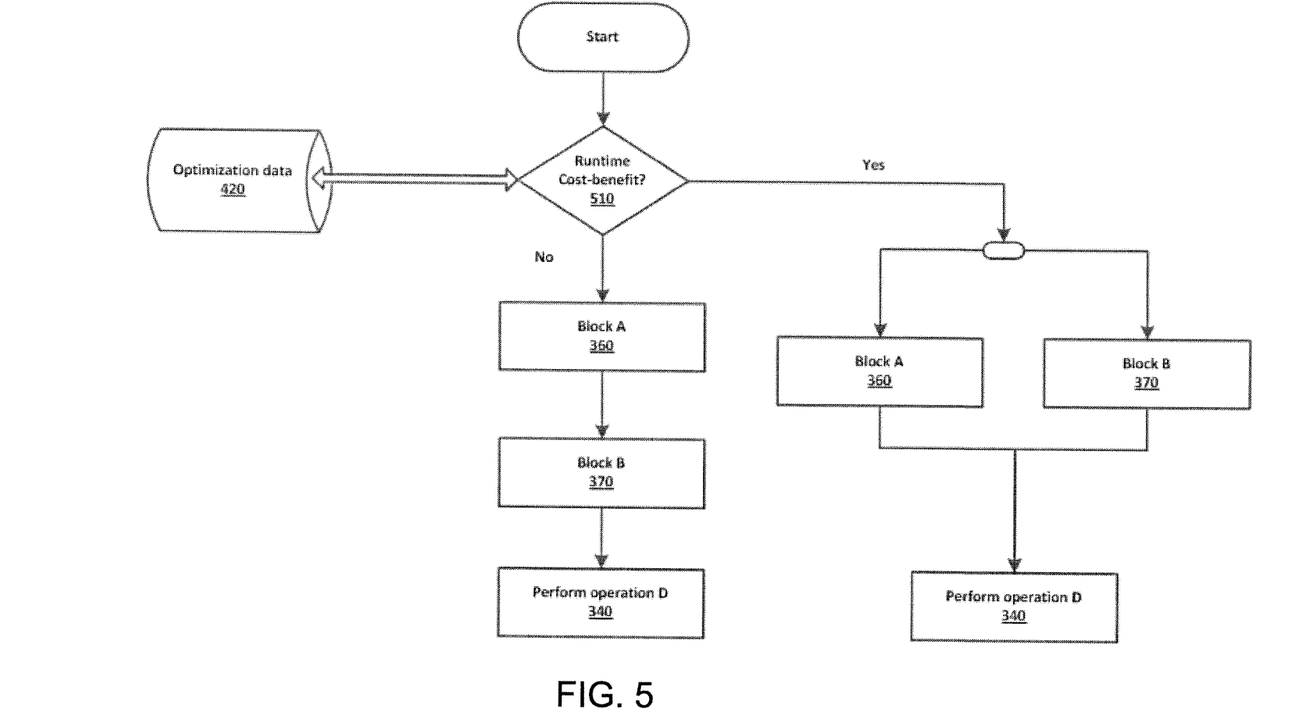
FIG. 5 is an illustrative flow diagram depicting forms of execution of a software application on the basis of optimization data gathered.

Referring now to FIG. 5, in a subsequent execution, the database 420 may be queried to provide optimization data. If the data, on analysis, show positive cost-benefit with regard to resource usage, the runtime environment may modify the execution order to run block A, 360, and block B, 370, in parallel in subsequent iterations, as in 510. If no positive cost-benefit is shown, then the execution order of subsequent iterations will not be modified.

In some embodiments, the execution of the software is continually profiled, and if parallelization subsequently results in less efficient resource usage, or resource deadlocks, then the execution of the blocks A and B, 360 and 370, as described, may be forced to be sequential by the runtime environment.

An additional example may be described with respect to a simple workflow for order processing in a computer system. The steps in the workflow may be as follows:
1. Receive data
2. Update data processing system
3. Notify X through e-mail
4. Notify Y through e-mail
5. Notify Z through e-mail An initial analysis, i.e., an analysis of the first execution of the workflow, would identify that the notification steps that involve notifying actors X, Y and Z through e-mail can be potentially executed in parallel, as no data dependency may exist between each of the notification steps. The optimization model thus created may contain information on the resources, such as processor or network or memory resources required for the notification steps, the time required to execute each e-mail script, a measure of the resource overhead for parallelization of the notification steps, and resource availability. The result of a comparison of the runtime resource availability against a required resource requirement, on the basis of the optimization model, is decisive in choosing an optimization path. For example, if the e-mails to be sent include large attachments for which there is a non-negligible memory usage cost, system memory resources may be unable to support parallelization of the notification steps. That is, if there is a heavy system load associated with parallel execution of the notification steps, then the system may execute said notification steps in a serial manner.

Further, if the system identifies that the resource requirement, including the cost of parallelization, or time to execute has reduced, due to, for example, improved network conditions or the addition of hardware in the form of, for example, more or better processors, the parallelization rule may then be redefined without manual intervention. In effect, if more resources become available, the system may subsequently parallelize the notification steps. Finally, embodiments of the present invention may be implemented, for example, in a middleware environment associated with the computer system.

The present description includes the best presently-contemplated method for carrying out the present invention. Various modifications to the embodiment will be readily apparent to those skilled in the art and some features of the present invention may be used without the corresponding use of other features. Accordingly, the present invention is not intended to be limited to the embodiments shown but is to be accorded the widest scope consistent with the principles and features described herein.

What is claimed is:

1. A computer implemented method for optimizing the performance of one or more software components, the method comprising:

identifying, by a component optimization computing device, a plurality of software components for parallel execution, wherein the plurality of software components comprise a software application, workflow, process, or a software component implementing at least one discrete functionality;

executing, by the component optimization computing device, the identified plurality of software components;

profiling, by the component optimization computing device, performance of the executed plurality of software components at runtime, wherein the profiling comprises gathering performance data related to one or more performance characteristics of the executed plurality of software components at runtime;

creating, by the component optimization computing device, an optimization model based on the performance data, wherein the optimization model comprises a cost-benefit evaluation of parallelization of the executed plurality of software components based on comparing resource overhead associated with parallel execution of each one of the executed plurality of software components to the resource overhead associated with serial execution of each one of the executed plurality of software components; and marking, by the component optimization computing device, at least two of the plurality of software components for parallel execution in a subsequent execution of the plurality of software components based on the optimization model.

2. The method as set forth in claim 1, wherein the identifying is performed at a compile time by a compiler, or at runtime based on a predefined algorithm.

3. The method as set forth in claim 1, wherein the executing the plurality of software components occurs in a runtime environment comprising an operating system, a virtual machine, or an application server.

4. The method as set forth in claim 1, wherein the of performance data comprises a processor utilization metric, a memory usage metric, a disk usage metric, or a network usage metric.

5. The method as set forth in claim 1, further comprising:
  iteratively executing, by the component optimization computing device, the plurality of software components at least twice; and
  refining, by the component optimization computing device, the optimization model after each iteration based on the performance data.

6. The method as set forth in claim 1, wherein the resource overhead associated with the execution of each of the plurality of software components is determinative of the optimization model.

7. The method as set forth in claim 1, further comprising:
  marking, by the component optimization computing device, one or more of the plurality of software components for sequential execution when the resource overhead associated with the execution in parallel of at least two of the marked one or more of the plurality of software components exceeds available runtime resources.

8. The method as set forth in claim 1, further comprising:
  marking, by the component optimization computing device, one or more of the plurality of software components for sequential execution when throughput of the system for execution of the marked one or more of the plurality of software components is negatively affected by the execution in parallel of at least two of the marked one or more of the plurality of software components.

9. A software component optimization computing device comprising:
  at least processor;
  a memory coupled to the processor which is configured to be capable of executing programmed instructions comprising and stored in the memory to:
    identify a plurality of software components for parallel execution, wherein the software components comprise a software application, a workflow, a process, or a software component implementing one or more discrete functionality;
    execute the identified plurality of software components;
    profile performance of the executed plurality of software components at runtime, wherein the profiling comprises gathering performance data related to one or more performance characteristics of the executed plurality of software components at runtime;
    create an optimization model based on the performance data, wherein the optimization model comprises a cost-benefit evaluation of parallelization of the executed plurality of software components based on comparing resource overhead associated with parallel execution of each one of the executed plurality of software components to the resource overhead associated with serial execution of each one of the executed plurality of software components; and
    mark at least two of the plurality of software components for parallel execution in a subsequent execution of the plurality of software components based on the optimization model.

10. The device as set forth in claim 9, wherein the identifying is performed at a compile time by a compiler, or at runtime based on a predefined algorithm.

11. The device as set forth in claim 9, wherein the executing the plurality of software components occurs in a runtime environment comprising an operating system, a virtual machine, or an application server.

12. The device as set forth in claim 9, wherein the performance data comprises a processor utilization metric, a memory usage metric, a disk usage metric, or a network usage metric.

13. The device as set forth in claim 9, wherein the processor is further configured to be capable of executing programmed instructions comprising and stored in the memory to:
  iteratively execute the plurality of software components at least twice; and
  refine the optimization model after each iteration based on the performance data.

14. The device as set forth in claim 9, wherein the resource overhead associated with the execution of each of the plurality of software components is determinative of the optimization model.

15. The device as set forth in claim 9, wherein the processor is further configured to be capable of executing programmed instructions comprising and stored in the memory to:
  mark one or more of the plurality of software components for sequential execution when the resource overhead associated with the execution in parallel of at least two of the marked one or more of the plurality of software components exceeds available runtime resources.

16. The device as set forth in claim 9, wherein the processor is further configured to be capable of executing programmed instructions comprising and stored in the memory to:
  mark one or more of the plurality of software for sequential execution when throughput of the system for execution of the marked one or more of the plurality of software components is negatively affected by the execution in parallel of at least two of the marked one or more of the plurality of software components.

17. A non-transitory computer readable medium having stored thereon instructions for optimizing the performance of one or more software components at runtime, comprising machine executable code which when executed by at least one processor causes the processor to perform steps comprising:
  identifying a plurality of software components for parallel execution, wherein the plurality of software components comprise a software application, a workflow, a process, or a software component implementing at least one discrete functionality;
  executing the identified plurality of software components;
  profiling the performance of the one or more software components at an execution time, wherein profiling comprises gathering performance data related to one or more performance characteristics of the plurality of software components at runtime;
  creating an optimization model based on the performance data, wherein the optimization model comprises a cost-benefit evaluation of parallelization of the executed plurality of software components based on comparing resource overhead associated with parallel execution of each one of the executed plurality of software components to the resource overhead associated with serial execution of each one of the executed plurality of software components; and
  marking at least two of the plurality of software components for parallel execution in a subsequent execution of the plurality of software components based on the optimization model.

18. The medium as set forth in claim 17, wherein the identifying is performed at a compile time by a compiler, or at runtime based on a predefined algorithm.

19. The medium as set forth in claim 17, wherein the executing the plurality of software components occurs in a runtime environment comprising an operating system, a virtual machine, or an application server.

20. The medium as set forth in claim 17, wherein the performance data comprises a processor utilization metric, a memory usage metric, a disk usage metric, or a network usage metric.

21. The medium as set forth in claim 17, further having stored thereon instructions that when executed by the processor cause the processor to perform steps further comprising:
   iteratively executing the plurality of software components at least twice; and
   refining the optimization model after each iteration based on the performance data.

22. The medium as set forth in claim 17, wherein the resource overhead associated with the execution of each of the plurality of software components is determinative of the optimization model.

23. The medium as set forth in claim 17, further having stored thereon instructions that when executed by the processor cause the processor to perform steps further comprising:
   marking one or more of the plurality of software components for sequential execution when the resource overhead associated with the execution in parallel of at least two of the marked one or more of the plurality of software components exceeds available runtime resources.

24. The medium as set forth in claim 17, further having stored thereon instructions that when executed by the processor cause the processor to perform steps further comprising:
   marking one or more of the plurality of software for sequential execution when throughput of the system for execution of the marked one or more of the plurality of software components is negatively affected by the execution in parallel of at least two of the marked one or more of the plurality of software components.

25. The medium as set forth in claim 17, further having stored thereon instructions that when executed by the processor cause the processor to perform steps further comprising:
   excuting one or more of the plurality of software components sequentially when the performance data indicates less efficient resource usage or a resource deadlock.

26. The method as set forth in claim 1, further comprising:
   excuting, by the component optimization computing device, one or more of the plurality of software components sequentially when the performance data indicates less efficient resource usage or a resource deadlock.

27. The device as set forth in claim 9, wherein the processor is further configured to be capable of executing programmed instructions comprising and stored in the memory to:
   excute one or more of the plurality of software components sequentially when the performance data indicates less efficient resource usage or a resource deadlock.

* * * * *